United States Patent
Sama et al.

(10) Patent No.: US 9,756,135 B2
(45) Date of Patent: Sep. 5, 2017

(54) ACCESSING NETWORK SERVICES FROM EXTERNAL NETWORKS

(71) Applicant: CA, INC., Islandia, NY (US)

(72) Inventors: Venkatababji Sama, Bangalore (IN); Igor V. Balabine, Menlo Park, CA (US); Suril Desai, Bangalore (IN); Akkamapet Palaniappan Sundarraj, Cupertino, CA (US)

(73) Assignee: CA, INC., Islandia, NY (US)

( * ) Notice: Subject to any disclaimer, the term of this patent is extended or adjusted under 35 U.S.C. 154(b) by 102 days.

(21) Appl. No.: 14/483,747

(22) Filed: Sep. 11, 2014

(65) Prior Publication Data

US 2016/0036920 A1 Feb. 4, 2016

Related U.S. Application Data

(60) Provisional application No. 62/031,708, filed on Jul. 31, 2014.

(51) Int. Cl.
*H04L 29/08* (2006.01)
*H04L 29/06* (2006.01)
*H04L 12/933* (2013.01)

(52) U.S. Cl.
CPC ............ *H04L 67/141* (2013.01); *H04L 49/15* (2013.01); *H04L 63/10* (2013.01); *H04L 63/166* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2010/0235903 A1* | 9/2010 | Carter | H04L 63/0272 726/15 |
| 2011/0107398 A1* | 5/2011 | Earl | H04L 9/32 726/3 |
| 2013/0304853 A1* | 11/2013 | Cooper | G06F 9/5055 709/217 |

(Continued)

OTHER PUBLICATIONS

Celestix DAX 6200 Series DirectAccess Appliance, Product Data Sheet, Celestix DAX 6200 Series, 2 pages, retrieved from the internet Jul. 28, 2014, http://www.celestixworks.com/DAX-6200.asp.

(Continued)

*Primary Examiner* — Kevin Bates
*Assistant Examiner* — Lesa Kennedy
(74) *Attorney, Agent, or Firm* — Sage Patent Group

(57) ABSTRACT

A method for accessing network services from external networks includes receiving at a cloud-based server a bridge setup request from a private communication system, establishing a bridge connection between the cloud-based server and the private communication system, establishing a communication path between the cloud-based server and a cloud-based application, receiving a request from a cloud-based entity that is directed to an enterprise service hosted within the private communication system, transmitting the request to the enterprise service over the bridge connection, receiving a response from the enterprise service over the bridge connection, and transmitting the response to the cloud-based entity. Related computer program products and systems are also disclosed.

7 Claims, 7 Drawing Sheets

(56) References Cited

U.S. PATENT DOCUMENTS

2014/0040502 A1* 2/2014 McClenahan .......... H04L 67/10
709/238
2014/0366155 A1* 12/2014 Chang .................... G06F 21/10
726/27
2015/0229638 A1* 8/2015 Loo ....................... G06Q 10/10
726/9

OTHER PUBLICATIONS

"Citrix CloudBridge Product Overview", Product Overview, Copyright@2014, Citrix Systems, Inc., 4 pages, retrieved from the internet Jul. 28, 2014, www.citrix.com.
"Citrix Cloudbridge: Optimizes and Controls Applications to all Locations: Branch, Datacenter, Public Clouds and Mobile Users", *Citrix Cloudbridge Data Sheet*, Copyright@2014, pp. 1-7, www.citrix.com.

* cited by examiner

ACCESSING NETWORK SERVICES FROM EXTERNAL NETWORKS

CROSS-REFERENCE TO RELATED APPLICATION

The present application claims priority under 35 U.S.C. §119(e) to U.S. Provisional Patent Application Ser. No. 62/031,708, filed Jul. 31, 2014, the content of which is incorporated herein by reference as if set forth in its entirety.

BACKGROUND

The present inventive concepts relate to communications networks. In particular, the present inventive concepts relate to systems, methods and computer program products for accessing network services from external networks.

Cloud-based computing services are becoming ubiquitous in the information technology (IT) industry. In a cloud-based system, services consumed by a business may be hosted and managed by a remote cloud service provider instead of being hosted by the business. The physical resources employed by the cloud service provider, such as servers, storage devices, communication devices, etc., can be shared among multiple consumers, allowing IT customers to benefit from economies of scale that they may not be able to achieve on their own. Moreover, these resources can be reallocated dynamically by the service provider to meet changing demands.

Cloud-based services may be hosted in a manner that allows the service provider to provide redundancy, load sharing, automated backups, and other features in support of the customer's services. In addition, cloud-based services may provide a number of other benefits to IT consumers, as the customer may experience reduced infrastructure costs, reduced IT management costs, and an increased ability to respond to changing market conditions.

However, even when an IT customer relies on cloud-based services for at least some of its IT processing needs, the IT consumer may still host some services themselves within private networks. These may include legacy services that cannot easily be migrated to a cloud service provider, services that the IT consumer prefers to maintain as strictly enterprise-based services, services that for some other reason cannot be migrated to a cloud service provider, or services that generate data that for security reasons cannot be exposed to the cloud.

When an IT consumer relies on both cloud-based services and private enterprise-based services, it is sometimes necessary for the cloud-based services to access the enterprise-based services, and vice versa.

For example, in an example network configuration shown in FIG. 1, an IT consumer may operate a private communications system 10 that hosts enterprise services 12. The IT consumer may also consume cloud services 14 that are hosted by a cloud service provider within a cloud 15. For example, the cloud services 14 may include a mobility service, a credit card processing service, etc., and the enterprise services may include a directory service, a certificate authority, a content management service, etc. Although specific examples are provided in the various embodiments described herein, many other different types of services may be provided as cloud services and/or enterprise services.

The enterprise services 12 may reside inside the private communications system 10 (e.g., within an Intranet) behind a secure firewall (not shown) in an effort to limit access to the enterprise services 12 to authorized entities only.

To enhance security of the enterprise services 12, external communications with the enterprise services may be routed through a virtual private network (VPN) server 13 that establishes VPN connections with the cloud services 16 that are authorized to access the enterprise services 12. This approach may thereby provide a number of secured site-to-site VPN tunnels 18 between the VPN server 13 and the respective cloud-based entities 14, which may include cloud-based clients and/or cloud-based services.

However, this solution is not ideal. From the standpoint of the cloud service provider, each VPN tunnel 18 may require manual configuration, and each cloud service may need to support various VPN protocols and networking vendors. Thus, the establishment and maintenance of VPN connections to new IT consumers may be laborious, as the VPN connections for each new IT consumer may require customized configuration and setup.

From the standpoint of the IT consumer, each VPN tunnel is a direct connection to the cloud 15, as a site-to-site VPN opens up access to remote cloud-based services. Each VPN connection represents an entrance point to the private communications system 10 that could potentially be subject to security breaches instead of exposing only those services that are required for operation.

SUMMARY

A method according to some embodiments includes receiving, at a cloud-based server, a bridge setup request from a private communication system, in response to the bridge setup request, establishing a bridge connection between the cloud-based server and the private communication system, establishing a communication path between a cloud-based server a cloud-based application, receiving a request from the cloud-based entity that is directed to an enterprise service hosted within the private communication system, transmitting the request to the enterprise service over the bridge connection, receiving a response from the enterprise service over the bridge connection, and transmitting the response to the cloud-based entity.

A method according to further embodiments includes establishing a bridge connection from a private communication network to a cloud-based server, receiving a service request over the bridge connection, wherein the service request originated from a cloud-based entity external to the cloud-based server and is directed to an enterprise service hosted within the private communication system, transmitting the service request to the enterprise service, receiving a response to the request from the enterprise service, and transmitting the response to the cloud-based server over the bridge connection.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Figure 1:
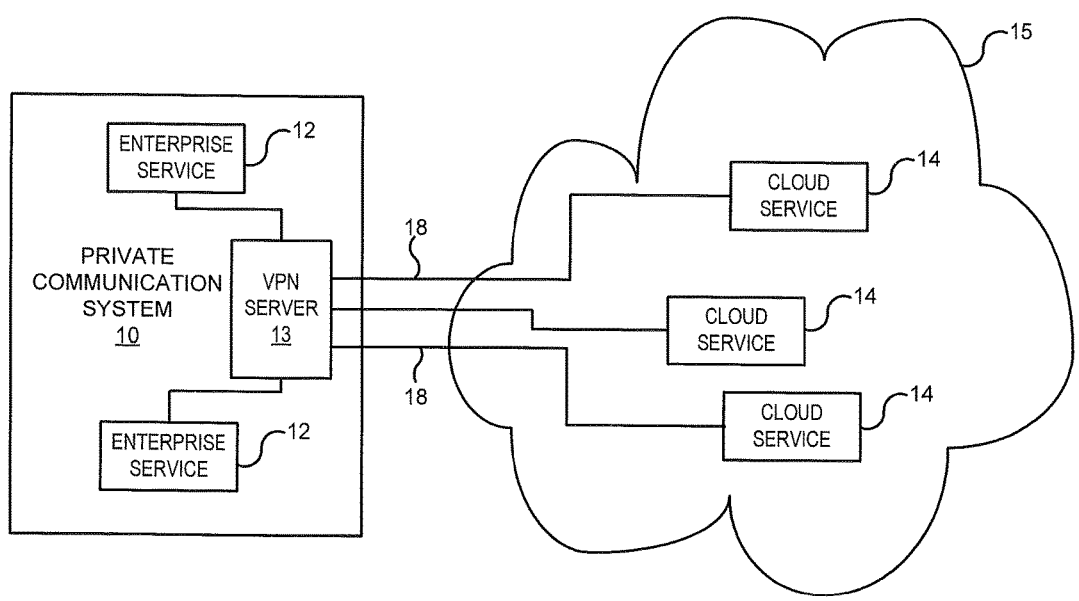
FIG. 1 is a block diagram that illustrates the use of a virtual private network to access enterprise services within a private communications system.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Some embodiments provide systems, methods and computer program products for accessing private network services in a secure manner. In particular, some embodiments provide bridge systems/services that provide secure communications between cloud-based services operated by a cloud service provider and enterprise services operated by a cloud service consumer, generally referred to herein as a "tenant."

Some embodiments provide a connector service which runs in the cloud and may support multiple tenants simultaneously, and a tenant application which runs in the tenant's network. The connector service and the tenant application cooperate to provide secure communications between the cloud-based services and the enterprise services. For example, mobile cloud services that are employed by a tenant, such as Mobile Device Management and/or Mobile Application Management, may require specific information from enterprise services for their operation, such as active directory or certificate authority information.

The tenant application may establish a secured outbound connection to the connector service. "Outbound" means that the secured connection is initiated by the tenant application within the tenant's communication system. this relieves the configuration concern for deployment for not having to drill a hole in the firewall. The outbound connection may be secured, for example, using transaction layer security (TLS) secured TCP/IP or using standard secure HTTPS protocols. This approach may avoid the need to drill any firewall holes in the tenant's network for inbound connections. Thus, the tenant's communication system may not admit or process inbound connection requests. This limits the exposure of the tenant's communication system to the cloud, and may provide additional security against flooding denial of service (DoS) attacks against the tenant's communication system.

In some embodiments, the tenant application may establish two parallel secured outbound connections to the connector service. One of the secured connections may be used for data traffic that is inbound from the connector service to the tenant application, and the other may be used for data traffic that is outbound from the tenant application to the connector service.

Cloud-based services may thereby use the connector service as a proxy for accessing various enterprise services that are hosted within the tenant's private communications system. The tenant application may be deployed on the customer premises or otherwise on customer-controlled equipment, and may access enterprise services provided by the tenant on behalf of the cloud-based client applications. Queries from the cloud services may be transported by the connector service securely over the public network to the tenant application. In some embodiments, queries from the cloud services may be transported by the connector service over a dedicated private communication channel to the bridge.

The tenant application and the connector service may be entirely unaware of the communication protocol(s) used to communicate between the cloud service and the enterprise service. Thus, the connector service/tenant application system may be capable of transporting data between the cloud service and the enterprise service that uses any point-to-point TCP protocol. However for purposes of logging, packets are tagged. The connector service/tenant application system may therefore be easily extended to newer communications protocols easily without modifications. Moreover, the connector service may be completely unaware of the location of the cloud services. That is, the connector service may communicate with any cloud services regardless of their location provided the cloud services have the ability to communicate over a common communications network with the connector service, such as the Internet.

On the tenant's network, the tenant application passes the payloads received from the cloud services to the enterprise services. Once the tenant application receives a corresponding response from the enterprise service, it forwards the response to the connector service over the secured channel. The response, in turn, is passed by the connector service on to the original cloud service. Thus, the connector service/tenant application system may provide seamless access to enterprise services without disclosing any details of the service deployment in the tenant's communications system.

It will be appreciated that multiple cloud services and/or multiple enterprise services may communicate over the single bridge between the connector service and the tenant application. Thus, each time a cloud service seeks to send a query to an enterprise service, and vice-versa, there is no need to establish a separate secure connection, such as a VPN connection, between the enterprise service and the cloud service. Accordingly, some embodiments may eliminate the need to establish site-to-site VPN connections to provide secure access to enterprise services by cloud services.

Figure 2:
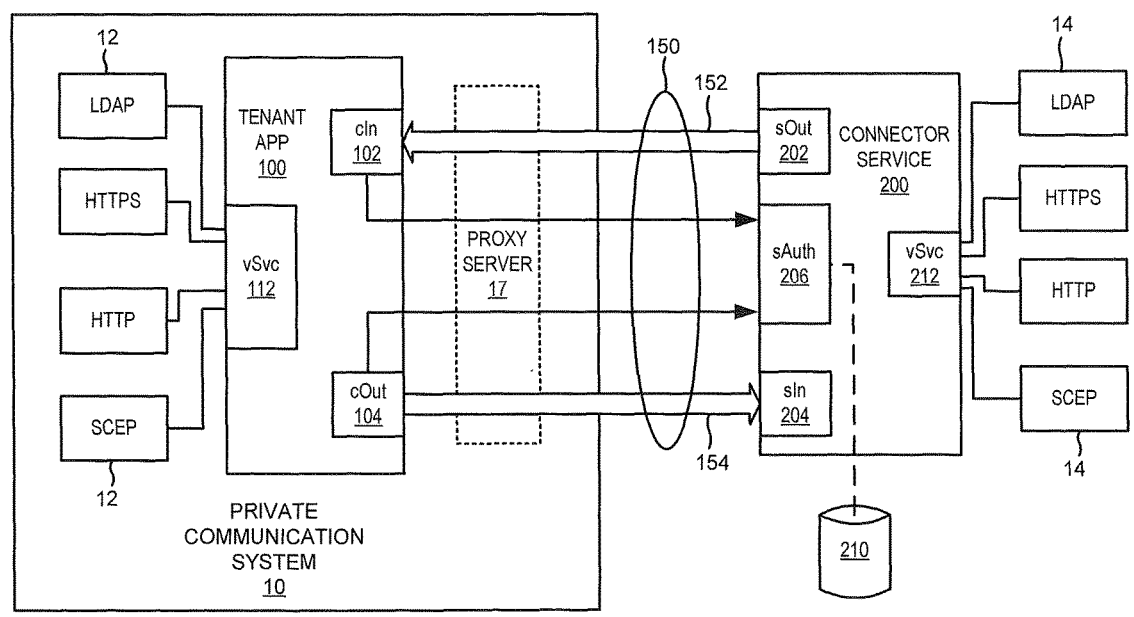
FIG. 2 is a block diagram that illustrates systems/methods according to some embodiments.

FIG. 2 is a block diagram that illustrates systems/methods according to some embodiments. As shown therein, a tenant application 100 is provided within a tenant's private communications system 10. The tenant application 100 communicates with a cloud-based Connection Service 200 over a bridge 150. The bridge 150 may include an outbound (from the point of view of the cloud) pipe 152 that carries data from the connector service 200 to the tenant application 100 and an inbound pipe 154 that carries data from the tenant application 100 to the connector service 200. Both the inbound pipe 152 and the outbound pipe 154 maybe established only in response to a connection request from the tenant application 100 to the connector service 200, and not vice-versa.

This approach also enables the systems/methods to be protocol agnostic in terms of the data that is carried over the pipes. Otherwise the connector service 200 would need to know protocol-specific information about the data that is being carried over the bridge 150, such as packet boundaries (how many bytes to read), flow timing (when to read and when to write), etc. That is, keeping two independent uni-directional pipes between the connector service 200 and the private communication system 10 allows the service to let the traffic flow without being aware of the packet boundaries or flow control protocols used by the underlying data stream.

Communications over the inbound and outbound pipes may use hypertext transport protocol (HTTP) and/or secure HTTP (HTTPS), and may be secured using Transport Layer Security (TLS) and/or Secure Socket Layer (SSL) protocols. Data transferred over the outbound pipe 154 may be transmitted using chunked HTTP encoding. Dividing the communication into an inbound pipe and an outbound pipe allows the system to take advantage of the HTTP protocol and its inner working of sending and receiving PDUs. Traffic can be carried simply through a standard TCP interface for bidirectional PDU flow. However, using the HTTP protocol provides distinct advantages over the use of generic TCP protocols. In particular, the use of HTTP protocols allows the pipes to be protocol agnostic, i.e., the pipes do not need to know the protocol of the data they are carrying. Furthermore, use of the HTTP/HTTPS protocol allows the messages to pass through a proxy server unchanged. Additionally, there may be no need to open a port in a firewall to allow the connections to be made to the private communication system 10, which may simplify the deployment of the service.

According to some embodiments, the tenant application 100 may initiate the establishment of the bridge 150, and the tenant application 100 may not respond to inbound connection requests from external communication systems, which may enhance the security and/or stability of the tenant's private communication system 10.

The tenant's private communication system 10 also includes a number of enterprise applications 12, that may be configured to communicate using any of a number of different communication protocols, including LDAP, HTTPS, HTTP, SCEP, and others. The tenant application 100 may communicate with external communications networks, such as the Internet, through an optional tenant-side proxy server 17. As is well known in the art, a proxy server is a computer system or an application that acts as an intermediary for requests from clients seeking resources from other servers. The proxy server 17 may use the http or https protocol, or may use automatic proxy discovery. The tenant's private communications system 10 may include many other types of resources and elements, which are omitted for clarity. For example, the system 10 may include one or more routers, switches, gateways, database servers, terminals, etc.

Figure 6:
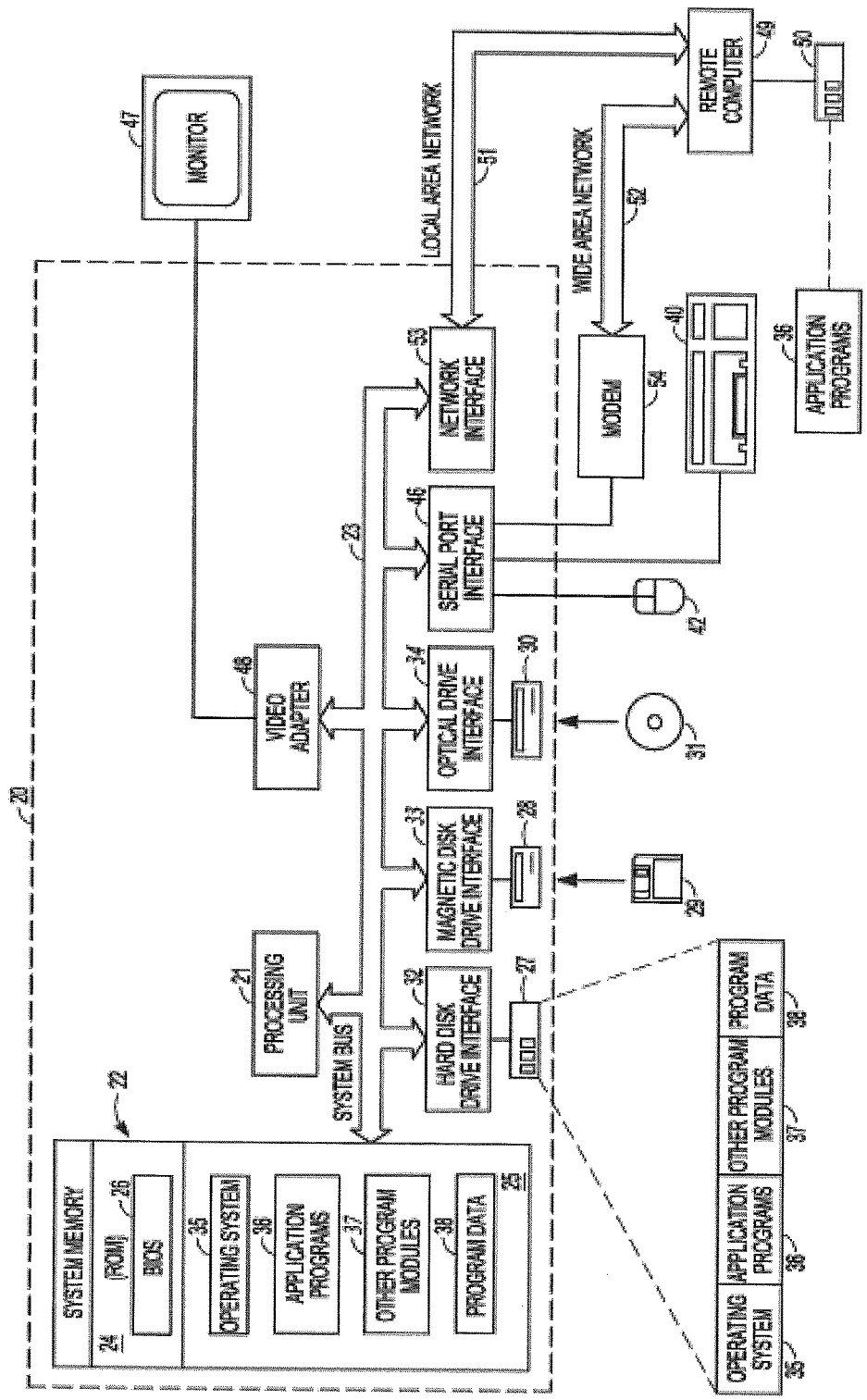
FIG. 6 is a block diagram illustrating a computer system that may be used to implement various elements of the disclosed embodiments.

The tenant application 100 may be implemented, for example, on a computer system as illustrated in FIG. 6. The tenant application 100 includes a number of elements that enable it to communicate with a connector service 200 that resides outside the tenant's private communications system 10, e.g., in "the cloud." In particular, the tenant application 100 includes a Virtual Service Connector (vSvc) 112 that is used by the tenant application to connect to the enterprise services. In some implementations, it is also possible that the vSvc 112 could be an entry point by which the enterprise-based clients can reach out to the cloud-based services. Enterprise-based clients may therefore be configured to connect to the vSvc 112 when requesting a service from a cloud-based client.

The tenant application 100 further includes an ingress traffic manager (cIn) 102 and an egress traffic manager (cOut) 104. The ingress traffic manager 102 receives a transmission block including marshaled (bundled) protocol data units (PDUs) from the inbound pipe 152, unpacks the incoming PDUs, and passes the PDUs to the vSvc 112 for delivery to the respective private services to which they are addressed. The egress traffic manager (cOut) 104 receives protocol data units from the private services 12, bundles the PDUs into a transmission block, and places the transmission block including the bundled PDUs into the outbound pipe 154 for delivery to the connector service 200.

The connector service 200 includes a virtual service connector 212 that provides a virtual entry point for cloud-based entities 14 that request private services from the enterprise services 12. The cloud-based entities 14, which may communicate over a number of different communication protocols, such as LDAP, SCEP, HTTP, HTTPS, etc., connect to the vSvc 212 when requesting a service. The connector service 200 also includes an egress traffic manager (sOut) 202 and an ingress traffic manager (sin) 204. The egress traffic manager 202 receives protocol data units (requests) form the cloud-based clients 14 through the vSvc 212, marshals PDUs into a transmission block, and places the transmission block into the outbound pipe 152 for delivery to the tenant application 100. The ingress traffic manager 204 receives transmission blocks from the inbound pipe 154, unpacks protocol data units (responses) from the transmission blocks, and passes the PDUs to the vSvc 212 for delivery to the respective cloud-based entities 14.

The connector service 200 includes a virtual service connector 212 that provides a virtual entry point for cloud-based entities 14 that request private services from the enterprise services 12. The cloud-based entities 14, which may communicate over a number of different communication protocols, such as LDAP, SCEP, HTTP, HTTPS, etc., connect to the vSvc 212 when requesting a service. The connector service 200 also includes an egress traffic manager (sOut) 202 and an ingress traffic manager (sin) 204. The egress traffic manager 202 receives protocol data units (requests) from the cloud-based clients 14 through the vSvc 212, marshals PDUs into a transmission block, and places the transmission block into the outbound pipe 152 for delivery to the tenant application 100. The ingress traffic manager 204 receives transmission blocks from the inbound pipe 154, unpacks protocol data units (responses) from the transmission blocks, and passes the PDUs to the vSvc 212 for delivery to the respective cloud-based entities 14.

The authentication step must be completed prior to exchanging any data between the tenant application 100 and the connector service 200. As a result of authentication, the system uses separate session credentials for the ingress and the egress data tunnels. Session credentials may be provided for each traffic direction (i.e. for each of the outbound pipe 152 and the inbound pipe 254), and may include a URL and a pair of cookies. Having a separate set of cookies for each traffic direction may allows invalidating miscommunications without content look up.

As noted above, the tenant application establishes https-protected ingress and egress data transport pipes 152, 154 and authenticates application data to the connector service 200 using session credentials received from sAuth 206. The data transport pipes 152, 154 are opaque to the local infrastructure, such as network proxies or firewalls. A firewall on the cloud side may be configured to allow the CB data transport pipes 152, 154 to reach the connector service 200.

As will be apparent from the foregoing discussion, data generated by a plurality of cloud services that originates in the public cloud may be transmitted to the end points in the tenant's private communications network 10 over a single network connection, namely, the outbound pipe 152. Similarly, data generated by a plurality of enterprise services originating in the tenant's private communications network 10 may be transmitted to end points in the public cloud over a single network connection, namely, the inbound pipe 152.

In some embodiments, the tenant's private communications network may instantiate multiple instances of an enterprise service, and the tenant application may balance server loads for the enterprise service across a plurality of end points within the tenant's private communications network 10.

Figure 3:
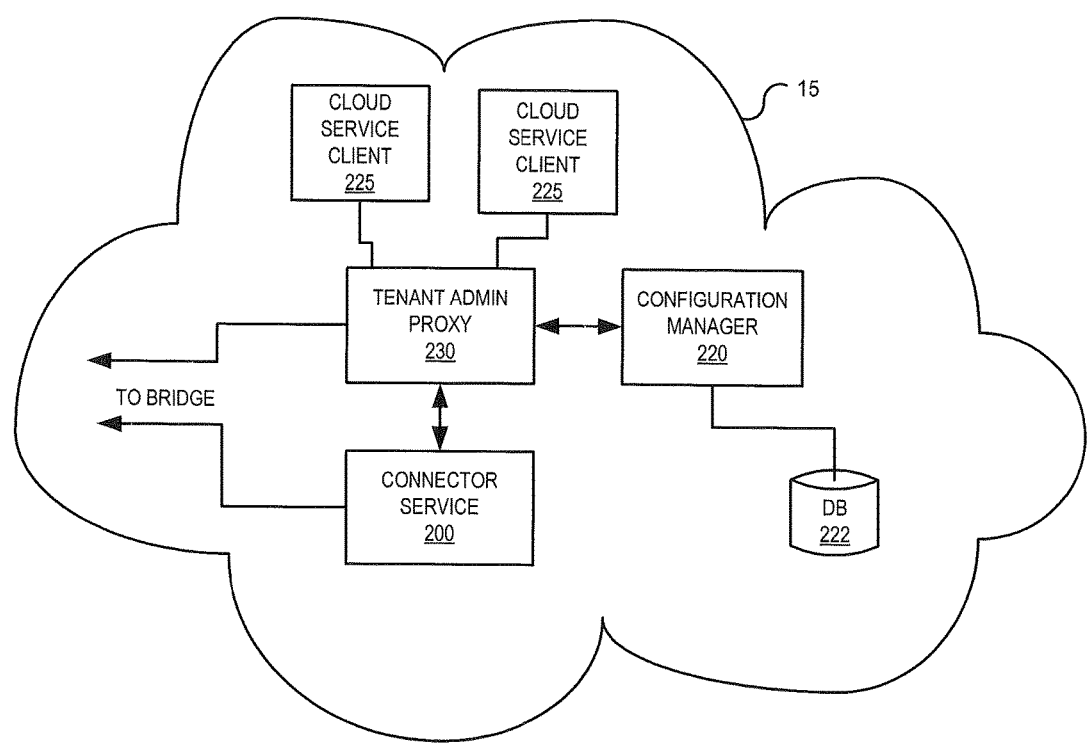
FIG. 3 is a block diagram that illustrates a bridge connector service in accordance with some embodiments.

FIG. 3 is a block diagram that illustrates a connector service 200 and related services in accordance with some embodiments. As shown therein, the connector service 200 may communicate with a tenant administration proxy 230 and a configuration manager 220. The connector service 200 may communicate with the cloud-based entities, such as cloud service clients 225, through the tenant administration proxy 230. The cloud based entities, such as cloud service clients 225, may communicate over the bridge through the tenant administration proxy 230. The configuration manager 220 may handle the set-up and take-down of the data transport pipes 152, 154. Configuration data is stored in a database 222 accessible to the configuration manager 220.

The configuration manager 220 may provide an application programming interface (API) that allows the connector service 200 to configure the bridge. The Bridge Configuration API (BC API) may also allow third parties to configure and query connector service tenants' information and, may provide a standardized API for integrating the configuration manager 220 with cloud-based services.

BC API methods may be invoked securely by a cloud based service on behalf of a cloud service administrator or a tenant administrator when configuring connector service or tenant application, respectively.

In particular, the cloud service administrator may engage the BC API when creating a tenant account, provisioning services available to the tenant, modifying a provisioned tenant's services, browsing tenant configuration information and removing a tenant account. A tenant administrator may invoke the BC API services to retrieve one-time connector service access credentials while configuring an on-premises tenant application component for the first time.

The connector service 200 may use BC API methods to poll the connector service 200 about changes in a tenant's configuration and to validate a tenant's credentials.

The BC API may be a RESTful API, meaning that it is based on the principles of the Representational State Transfer (REST) architecture. The BC API is a request—response protocol in which a client component issues a request and expects a response from the server component. The BC API may be based on the http protocol, and may use the GET, POST and DELETE http request methods.

Figure 4:
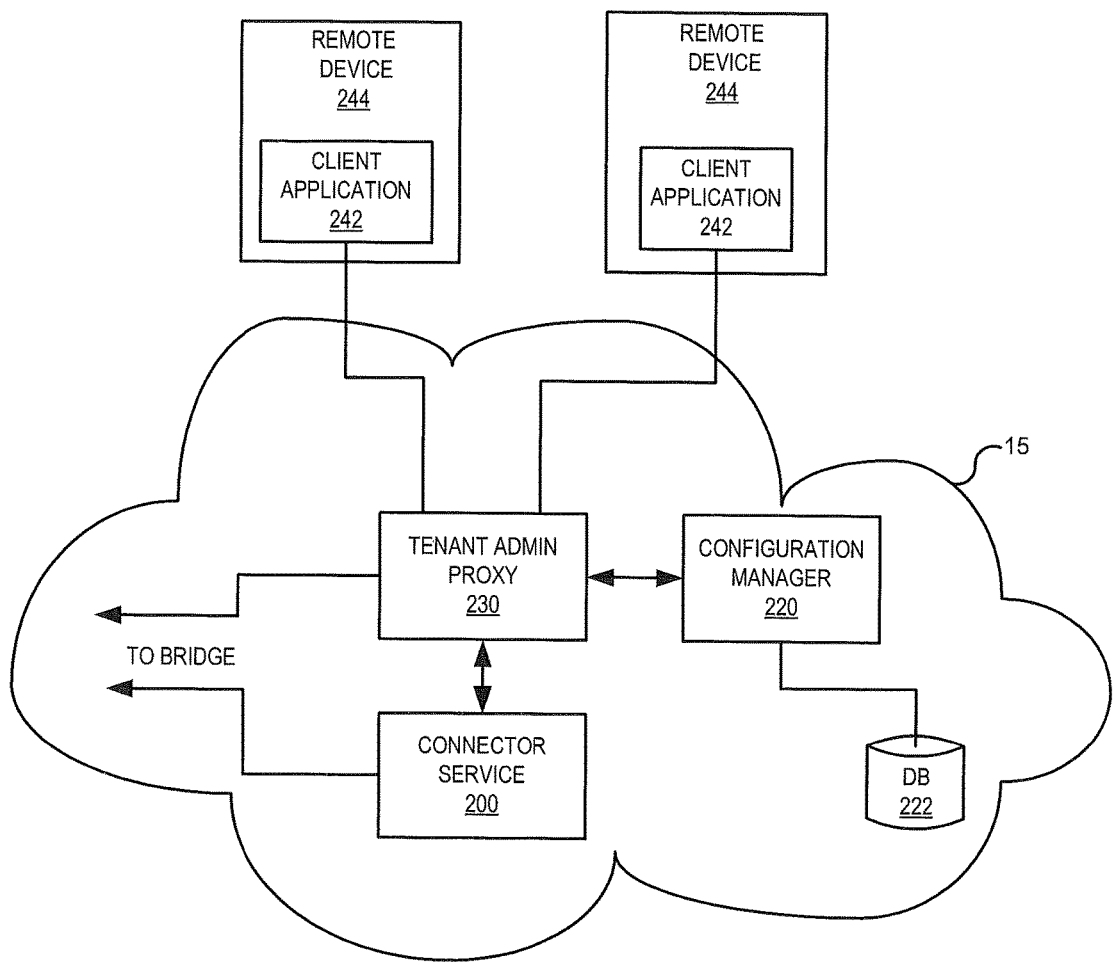
FIG. 4 is a block diagram that illustrates a bridge connector service in accordance with some embodiments.

FIG. 4 is a block diagram that illustrates a connector service 200 in accordance with further embodiments. As shown in FIG. 4, the connector service may be accessed in some embodiments by client applications 242 hosted on remote devices 244 outside the cloud, that is, that are not operated by the cloud service provider. The client applications 242 may communicate with the connector service 200 through a public communications network, such as the Internet, and the connector service 200 may not know the actual location of the client applications 242.

Accordingly, some embodiments provide methods of securely accessing private cloud services from an external communication network, such as a public cloud, for transferring end services data in an application protocol agnostic fashion to the public cloud over network connections established from the private cloud end point.

Figure 5A:
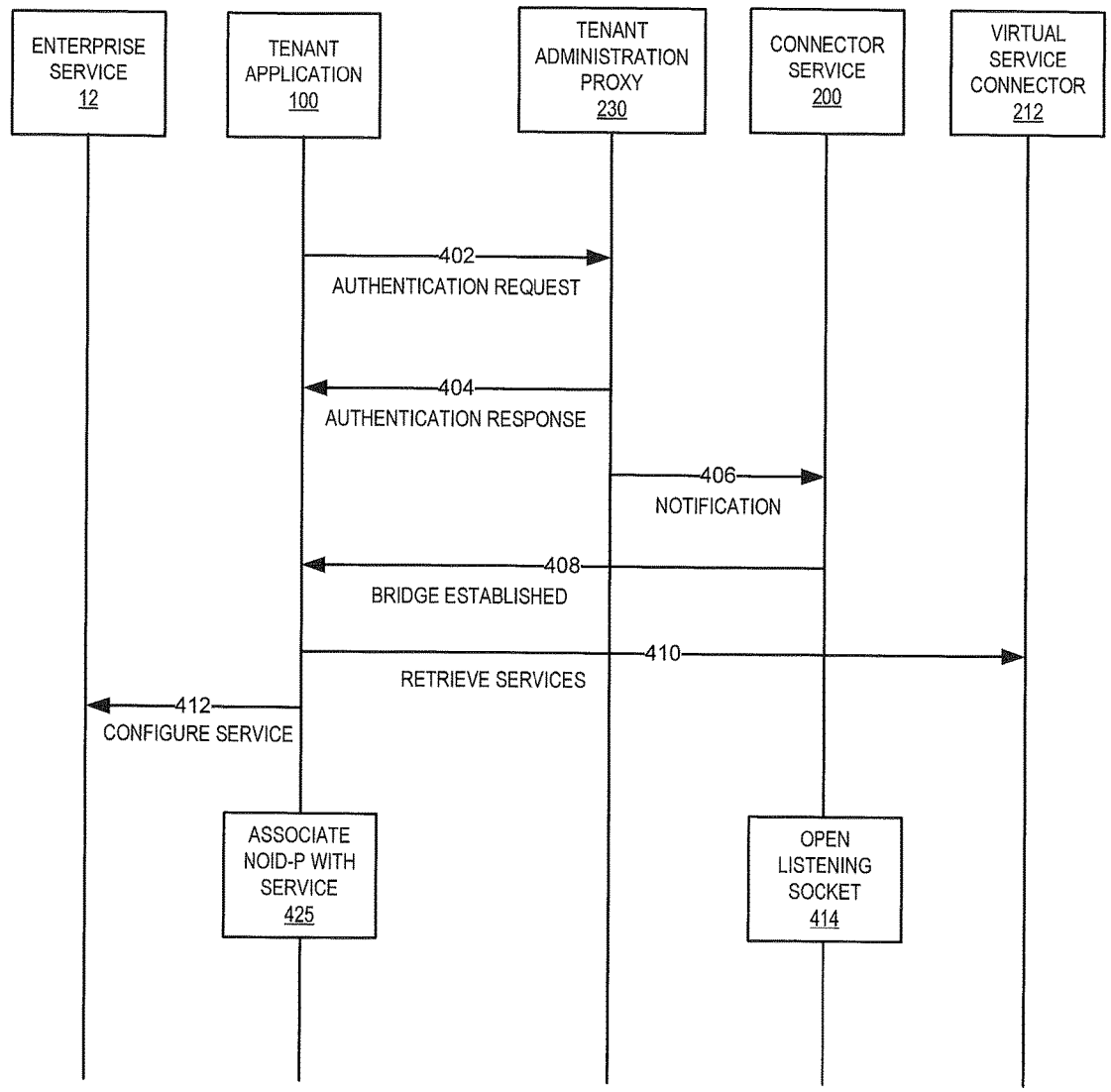
FIGS. 5A and 5B are block diagrams illustrating systems/methods in accordance with some embodiments.

FIG. 5A is a block diagram illustrating systems/methods in accordance with some embodiments. Referring to FIG. 5A, methods for establishing a connector service/tenant application bridge connection may include the following steps.

A tenant application 100 may initiate the setup of a bridge connection to the connector service 100 by sending an authentication request 402 to the tenant administration proxy 230. The authentication request may be processed by the tenant administration proxy 230, for example, by authenticating the tenant application 100 using the authentication service sAuth. Based on the result of the authentication, the tenant administration proxy 230 returns an authentication response 404 to the tenant application 100, and notifies the connector service 100 that a tenant application has been authenticated (arrow 406). The connector service 100 then sends a message 408 to the tenant application 100 indicating that the bridge has been successfully established.

The tenant application 100 may then discover/retrieve available cloud services by sending a message 410 to the virtual service connector 212. Service information for the tenants may be fetched from the virtual service connector 212 and provided to the enterprise services 12 via one or more messages 412. Meanwhile, service configuration information may be maintained by configuration manager 220 (FIG. 3).

The tenant application 100 may then associate a private side Network Object Identifier (NOID-P) with the enterprise service 12 (block 425).

After the bridge is established, the connector service 200 may open a listening socket in the cloud associated with the enterprise service 12 to listen for requests directed to the enterprise service 12 (block 414).

Figure 5B:
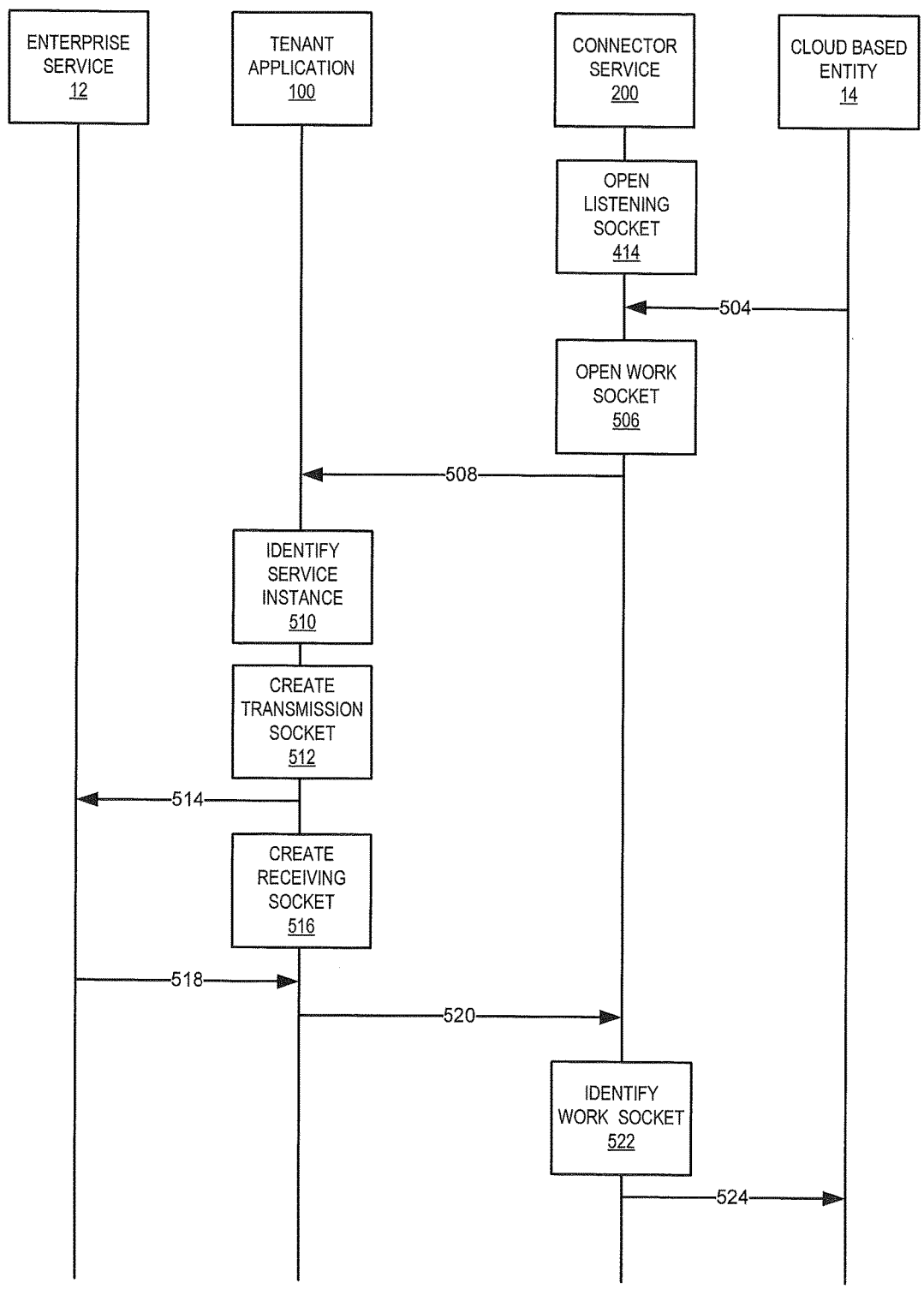

FIG. 5B is a block diagram illustrating systems/methods in accordance with some embodiments. Referring to FIG. 5B, methods for accessing an end service in the tenant's private communications system from cloud services operating in a public cloud through a connector service/tenant application bridge connection may include the following steps.

After a listening socket representing an enterprise service 12 in a private cloud is opened in the public cloud by the connector service 200 (block 414), a request is received at the connector service 200 from a cloud-based requestor, such as a cloud-based entity 14, to use services of the enterprise service 12. (Block 504) The request may be received as a connection to the listening socket opened in block 414.

A work socket corresponding to the listening socket may be opened (block 506), and the work socket may be used to retrieve information destined to the enterprise service 12.

The connector service 200 creates a virtual communication circuit by associating the work socket with a unique public cloud-side Network Object Identifier ("NOID-C"), a default private cloud-side Network Object Identifier ("NOID-Default") and an End Service Identifier ("ESID") which uniquely identifies an instance of the end service in the tenant's communications system 10. The virtual communication circuit work socket, ESID and NOID-C attributes may be saved in a transient storage.

The connector service then transmits information destined to the end service along with said NOID-C and ESID to the tenant application 100 (block 508).

The tenant application 100 uses the ESID to determine an end service instance in the tenant's communication system 10 to which transmitted information is destined (block 510), and completes the virtual communication circuit identification by extending its identifier with a unique private cloud-side Network Object Identifier (NOID-P).

In some embodiments, the tenant application 100 may perform load balancing. For example, when a request for an enterprise service 12 is received by the tenant application 100, the tenant application 100 may determine if the enterprise service 12 has capacity to handle the request. If the tenant application 100 determines that the enterprise service 12 does not have sufficient capacity to handle the request, the tenant application 100 may create another instance of the enterprise service within the tenant's communication system 10 and forward the request to the new instance of the enterprise service 12.

The tenant application 100 then creates a transmission socket and associates the transmission socket with the ESID, NOID-C and NOID-P attributes (block 512), and transmits the payload 514 to the enterprise service 12 to the enterprise service identified by ESID.

The tenant application 100 then transitions the transmission socket into the receiving state (block 516) and receives the response 518 from the enterprise service using the receiving socket.

The tenant application 100 associates the received response with the ESID, NOID-C and NOID-P attributes, and transmits the enterprise service's response and the ESID, NOID-C and NOID-P attributes to the connector service 200 (block 520).

Using the ESID, NOID-C and NOID-P attributes, the connector service 200 identifies the cloud side work socket (block 522).

The connector service 200 then transmits the enterprise service's response to the cloud-based requestor using the retrieved work socket (block 524).

FIG. 6 provides an overview diagram of a suitable computer hardware and computing environment in conjunction with which various embodiments may be practiced. In particular, the hardware environment illustrated in FIG. 6 may be used to implement one or both of the tenant application 100 and the connector service 200. The description of FIG. 6 is intended to provide a brief, general description in conjunction with which the embodiments may be implemented. Some embodiments are described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 6, a hardware and operating environment is provided that is applicable to the various software applications and tools described in the other figures and described above. It can be appreciated that the following hardware and operating environment might be used in connection with the development of the software application to be tested, the use and operation of the test case automation tool, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers or remote clients shown in the other figures. As shown in FIG. 6, one embodiment of the hardware and operating environment includes a general purpose computing device in the form of a computer 20 (e.g., a personal computer, workstation, or server), including one or more processing units 21, a system memory 22, and a system bus 23, that operatively couples various system components, including the system memory 22 to the processing unit 21. There may be only one or more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory 22 can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the example operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or methods described herein may be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a GUI for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to the computer 20, or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 or a wide area network (WAN) 52. Such networking environments are commonplace in office networks, enterprise-wide computer networks, intranets and the Internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device), or any other type of communications device (e.g., a wireless transceiver), for establishing communications over the WAN 52, such as the internet. The modem 54, which may be internal or external, is connected to the system bus 23 via the serial port interface 46. In a networked environment, program modules depicted relative to the computer 20 can be stored in the remote memory storage device 50 of remote computer/server 49. It is appreciated that the network connections shown are examples of, and communications devices for, establishing a communications link between the computers may be used including hybrid fiber-coax connections, T1-T3 lines, DSL's, OC-3 or OC-12, TCP/IP, microwave, wireless application protocol, and any other electronic media through any suitable switches, routers, outlets and power lines, as the same are known and understood by one of ordinary skill in the art.

Methods and systems disclosed herein may facilitate access to private cloud enterprise service end points from a public cloud infrastructure. Access is provided in a payload agnostic way, which enables the system to be easily extended to any point-to-point protocol payloads. Access to the enterprise services is provided securely in a fashion which may reduce exposure to Denial of Service attacks. Moreover, implementing a system in accordance with some embodiments may not require any significant changes to the tenant's private cloud networking security infrastructure.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

List of acronyms:
API—Application Programming Interface
ESID—End Service Identifier
HTTP—Hypertext Transport Protocol
HTTPS—Hypertext Transport Protocol Secure
IT—Information Technology
LDAP—Lightweight Directory Access Protocol
NOID-C—Cloud-side Network Object Identifier
NOID-P—Private-side Network Object Identifier
NOID-Default—Default Private-side Network Object Identifier
PDU—Protocol Data Unit
PKI—Public Key Infrastructure
SCEP—Simple Certificate Enrollment Protocol
SSL—Secure Socket Layer
TCP/IP—Transmission Control Protocol/Internet Protocol
TLS—Transport Layer Security
URL—Uniform Resource Locator
VPN—Virtual Private Network Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method, comprising:
receiving, at a cloud-based server, a bridge setup request from a tenant application in a private communication system;
in response to the bridge setup request, establishing a secure outbound bridge connection and a secure inbound bridge connection between the cloud-based server and the tenant application in the private communication system, wherein the secure outbound bridge connection and the secure inbound bridge connection comprise separate connections;
establishing a communication path between the cloud-based server and a cloud-based entity, wherein establishing the communication path between the cloud-based server and the cloud-based entity comprises associating a cloud-side network object identifier, NOID-C, with the cloud-based entity;
receiving a first request from the cloud-based entity that is directed to an enterprise service hosted within the private communication system;
determining an enterprise service identifier, ESID, associated with the enterprise service;
transmitting the first request, the NOID-C, and the ESID to the tenant application over the secure outbound bridge connection;
receiving a first response from the tenant application over the secure inbound bridge connection wherein the first response comprises the NOID-C, the ESID and a private side network identifier, NOID-P, associated with the enterprise service; and
transmitting the first response to the cloud-based entity;
wherein the cloud-based entity comprises a first cloud-based entity, the communication path comprises a first communication path, and the enterprise service comprises a first enterprise service, the method further comprising:
receiving a second request from a second cloud-based entity that is directed to a second enterprise service hosted within the private communication system;
combining the first request and the second request into a transmission block; and
transmitting the transmission block including the first request and the second request over the secure outbound bridge connection to the tenant application within the private communication system;
wherein receiving the first response from the tenant application comprises receiving a second response that is combined with the first response, the method further comprising:
separating the second response from the first response; and
transmitting the second response to the second cloud-based entity.

2. The method of claim 1, wherein the first enterprise service and the second enterprise service comprise different instances of a same enterprise service.

3. The method of claim 1, wherein the first enterprise service and the second enterprise service are the same service.

4. The method of claim 1, wherein establishing the bridge connection comprises authenticating the private communication system to the cloud-based server.

5. The method of claim 1, wherein the cloud-based entity comprises a cloud-based service and/or a cloud-based client application.

6. A computer program product comprising:
a non-transitory computer readable storage medium having computer readable program code embodied in the medium, the computer readable program code comprising computer readable program code configured to:
receive, at a cloud-based server, a bridge setup request from a tenant application in a private communication system;
in response to the bridge setup request, establish a secure outbound bridge connection and a secure inbound bridge connection between the cloud-based server and the tenant application in the private communication system, wherein the secure outbound bridge connection and the secure inbound bridge connection comprise separate connections;
establish a communication path between the cloud-based server a cloud-based entity, wherein establishing the communication path between the cloud-based server and the cloud-based entity comprises associating a cloud-side network object identifier, NOID-C, with the cloud-based entity;
receive a request from the cloud-based entity that is directed to an enterprise service hosted within the private communication system;
determine an enterprise service identifier, ESID, associated with the enterprise service;
transmit the request, the NOID-C and the ESID to the tenant application over the secure outbound bridge connection;
receive a first response from the tenant application over the secure inbound bridge connection wherein the first response comprises the NOID-C, the ESID and a private side network identifier, NOID-P, associated with the enterprise service; and
transmit the response to the cloud-based entity;
wherein the cloud-based entity comprises a first cloud-based entity, the request comprises a first request, the communication path comprises a first communication path, and the enterprise service comprises a first enterprise service, the computer readable code further configured to:
receive a second request from a second cloud-based entity that is directed to a second enterprise service hosted within the private communication system;
bundle the first request and the second request into a transmission block; and
transmit the transmission block including the first request and the second request over the secure outbound bridge connection to the tenant application in the private communication system;
wherein receiving the first response from the tenant application comprises receiving a second response that is combined with the first response, wherein the computer readable program code further comprises computer readable program code configured to:

separate the second response from the first response; and
transmit the second response to the second cloud-based entity.

7. A computer system, comprising:
a processor; and
a memory coupled to the processor, the memory comprising computer readable program code embodied therein that, when executed by the processor, causes the processor to perform operations comprising:
receiving, at a cloud-based server, a bridge setup request from a tenant application in a private communication system;
in response to the bridge setup request, establishing a secure outbound bridge connection and a secure inbound bridge connection between the cloud-based server and the tenant application in the private communication system, wherein the secure outbound bridge connection and the secure inbound bridge connection comprise separate connections;
establishing a communication path between the cloud-based server and a cloud-based entity, wherein establishing the communication path between the cloud-based server and the cloud-based entity comprises associating a cloud-side network object identifier, NOID-C, with the cloud-based entity;
receiving a request from the cloud-based entity that is directed to an enterprise service hosted within the private communication system;
determining an enterprise service identifier, ESID, associated with the enterprise service;
transmitting the request, the NOID-C, and the ESID to the tenant application over the secure outbound bridge connection;
receiving a first response from the tenant application over the secure inbound bridge connection wherein the first response comprises the NOID-C, the ESID and a private side network identifier, NOID-P, associated with the enterprise service; and
transmitting the response to the cloud-based entity;
wherein the cloud-based entity comprises a first cloud-based entity, the communication path comprises a first communication path, and the enterprise service comprises a first enterprise service, the operations further comprising:
receiving a second request from a second cloud-based entity that is directed to a second enterprise service hosted within the private communication system;
combining the first request and the second request into a transmission block; and
transmitting the transmission block including the first request and the second request over the secure outbound bridge connection to the tenant application within the private communication system;
wherein receiving the first response from the tenant application comprises receiving a second response that is combined with the first response, the method further comprising:
separating the second response from the first response; and
transmitting the second response to the second cloud-based entity.

* * * * *